Oct. 16, 1962 J. C. DAWSON ETAL 3,058,538
FLUID DISPENSING APPARATUS
Filed March 11, 1960 2 Sheets-Sheet 1

Joseph Carl Dawson,
Ray G. Cathcart,
Inventors.
Koenig and Pope,
Attorneys.

United States Patent Office 3,058,538
Patented Oct. 16, 1962

3,058,538
FLUID DISPENSING APPARATUS
Joseph Carl Dawson, Ferguson, and Ray G. Cathcart, St. Ann's, Mo., assignors to Ferguson Fumigants, Inc., Ferguson, Mo., a corporation of Missouri
Filed Mar. 11, 1960, Ser. No. 14,431
13 Claims. (Cl. 177—70)

This invention relates to fluid dispensing apparatus, and more particularly to apparatus for filling pressure cylinders.

Among the several objects of the invention may be noted the provision of fluid dispensing apparatus for successive dispensing of different fluids in measured quantities, and more particularly an apparatus for filling pressure cylinders with a liquid, such as the liquid fumigant disclosed in Dawson U.S. Patent 2,606,857, issued August 12, 1952, and providing a charge of compressed air in each cylinder, the compressed air being subsequently useful for forcing the liquid out of the cylinder; the provision of apparatus such as described having means responsive to the delivery of a predetermined amount of the first fluid (the liquid fumigant, for example) for automatically cutting off the delivery of the first fluid and instigating the delivery of the second fluid (air, for example), together with means responsive to delivery of a predetermined amount of the second fluid (e.g., responsive to build-up of a predetermined pressure in the case of air) for cutting off the delivery of the second fluid; and the provision of apparatus such as described which enables cylinders to be quickly, efficiently and accurately filled with a minimum of manual operations. Other objects and features will be in part apparent and in part pointed out hereinafter.

The invention accordingly comprises the constructions hereinafter described, the scope of the invention being indicated in the following claims.

Figure 1:
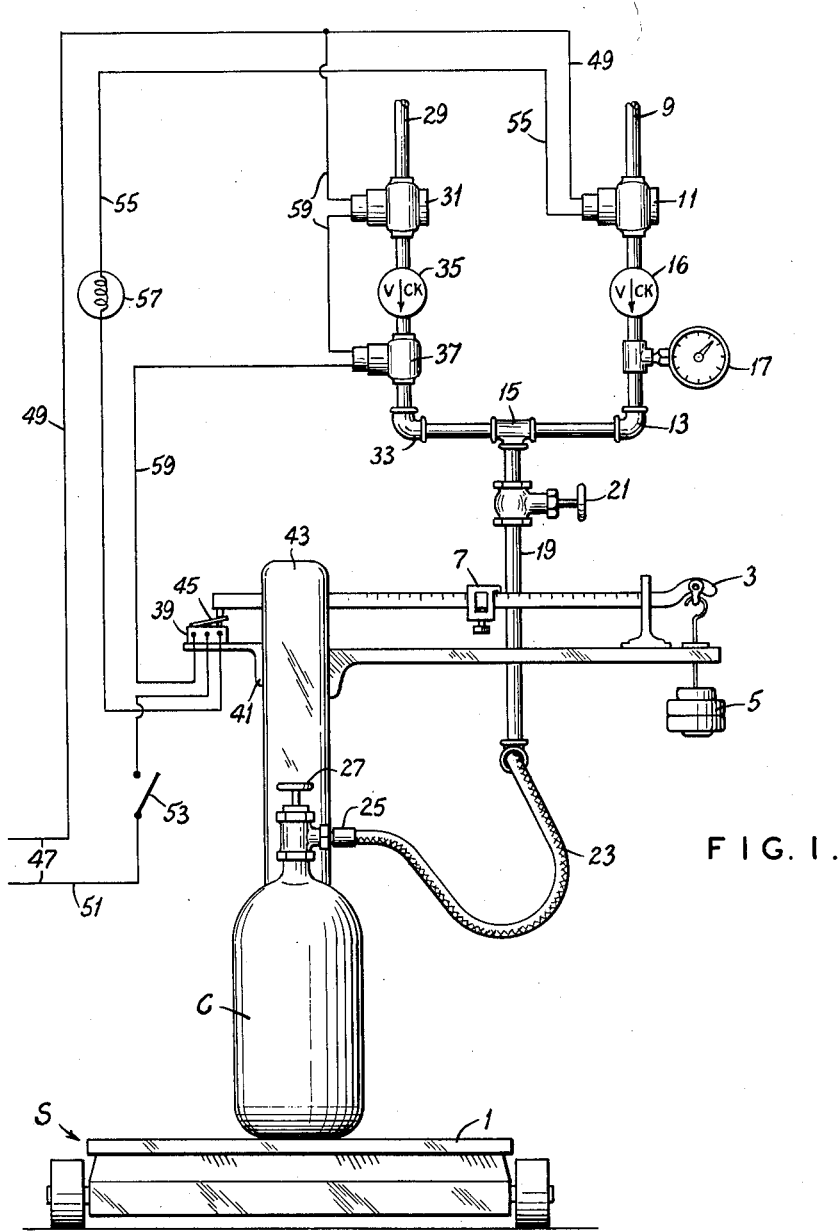
Figure 2:
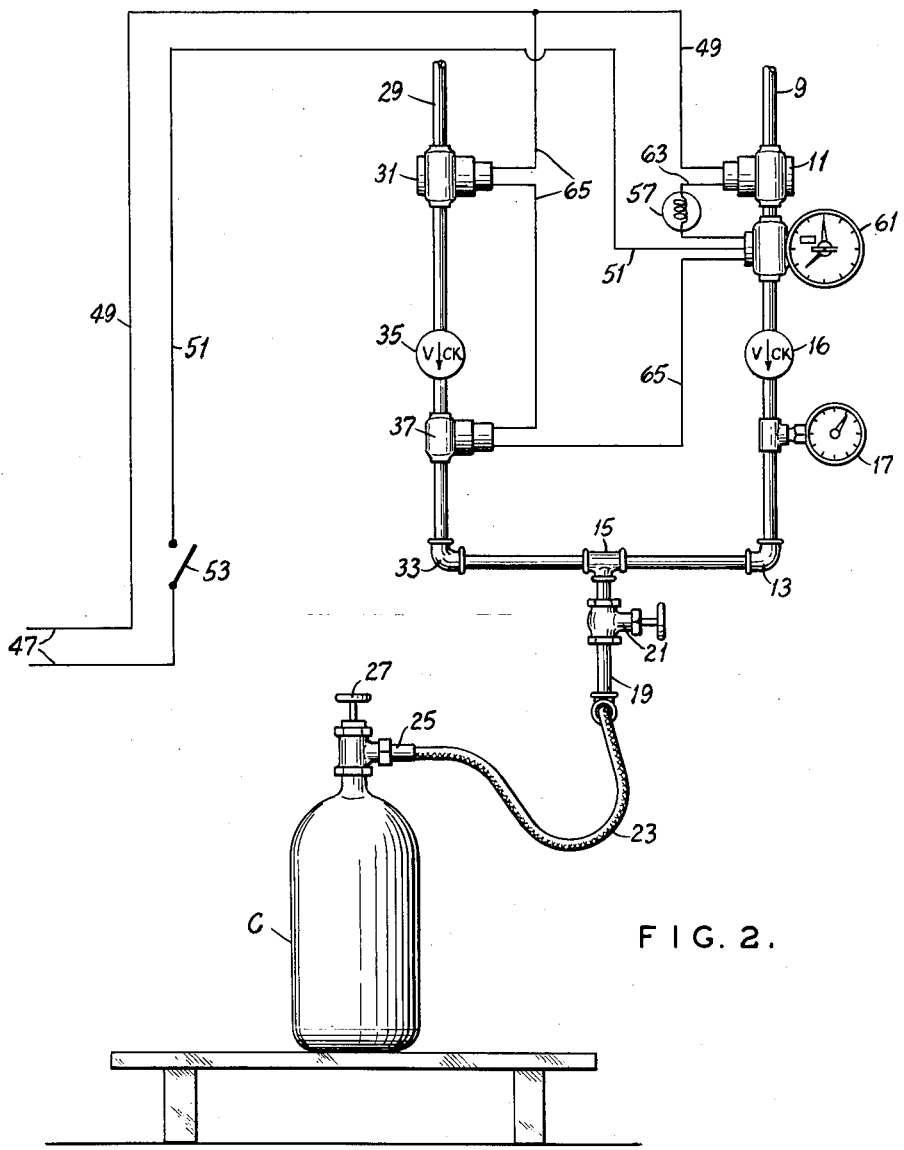

In the accompanying drawings, in which several of various possible embodiments of the invention are illustrated:

FIG. 1 is a view in elevation illustrating a cylinder filling apparatus of this invention, also showing electrical wiring thereof; and, FIG. 2 is a view similar to FIG. 1 showing a modification.

Corresponding reference characters indicate corresponding parts throughout the several views of the drawings.

Referring to FIG. 1 of the drawings, there is indicated at S a conventional platform scale having the usual platform 1 and beam 3. The beam has the usual main weight carrier 5 at its end and carries the usual sliding weight 7. A conventional pressure cylinder is indicated at C on the platform of the scale. This cylinder is to be filled with a predetermined weight of liquid, after which air under pressure is to be delivered into the cylinder until the air pressure in the cylinder reaches a desired value, this air pressure on top of the liquid in the cylinder being sometimes referred to as an "air pad."

At 9 is indicated a liquid delivery line (a pipe) for delivery of liquid from a source under pressure. This liquid delivery line 9 is connected to the inlet of a solenoid valve 11. The outlet of solenoid valve 11 is connected by a line 13 (piping) in continuation of line 9 to one branch of a T 15. Line 13 has a check valve 16 incorporated therein downstream from valve 11 adapted to open for flow of liquid from valve 11 to the T 15 and to close to prevent back flow. A pressure gauge 17 may be connected into line 13 if desired, but is not essential. A line 19 (piping) including a manual cut-off valve 21 extends from the stem of the T 15. A hose 23 extending from the end of line 19 has a coupler 25 at its end adapted for connection to the usual valve 27 at the top of the cylinder C. The arrangement is such that with hose 23 coupled to valve 27, and with valves 11, 21 and 27 open, liquid may be delivered into the cylinder C.

At 29 is indicated a compressed air delivery line (a pipe) for delivery of compressed air from a source thereof. This air delivery line 29 is connected to the inlet of a solenoid valve 31. The outlet of the solenoid valve is connected by a line 33 (piping) in continuation of line 29 to the other branch of the T 15. Line 29 has a check valve 35 incorporated therein downstream from valve 31 adapted to open for flow of air from valve 31 to the T and to close to prevent back flow. Line 33 also has a pressure-responsive switch 37 incorporated therein downstream from the check valve 35. The arrangement is such that with hose 23 coupled to cylinder valve 27, and with valves 31, 21 and 27 open, air may be delivered into the cylinder C.

A double-throw switch 39 is mounted on a bracket 41 on the post 43 of the scale S in position for actuation of switch arm 45 by the beam 3 of the scale. At 47 is indicated an electric power source including a line 49 connected to one terminal of the liquid solenoid valve 11, and a line 51 connected to the center (common) terminal of the double-throw switch 39. Line 51 includes a manual control switch 53 (an on-off switch). A line 55 connects the other terminal of liquid solenoid valve 11 and a second terminal of switch 39. A pilot lamp 57 may be connected in line 55. The air solenoid valve 31 and the air pressure switch 37 are connected in series in a line 59 between power line 49 and a third terminal of the switch 39. Switch arm 45 is up when beam 3 is down. With arm 45 up, switch 39 interconnects lines 55 and 51. When beam 3 swings up (counterclockwise as viewed in FIG. 1), arm 45 is moved down against the spring bias in switch 39 tending to move arm 45 up. This disconnects line 55 from line 51 and connects line 59 to line 51.

The operation of filling cylinder C is as follows:

The empty cylinder C is placed on platform 1 of the scale S and the beam is balanced by sliding the slidable balance weight 7 on the beam of the scale to determine the tare weight of the cylinder for record purposes, i.e., the tare weight is marked on a tag on the cylinder. Then hose 23 is coupled to valve 27 of the cylinder, and beam 3 is rebalanced on account of the weight of the hose. Then a weight appropriate for the weight of liquid to be delivered into the cylinder C is applied to carrier 5 at the end of the beam. For example, assuming that the cylinder C is to be filled with fifty pounds of liquid, a fifty pound balance weight is used. This, of course, makes the beam swing down. The sliding weight 7 is pushed back slightly on the beam 3 (say one pound, for example). Valves 21 and 27 are opened, and then switch 53 is closed to initiate a filling cycle.

With beam 3 down so that switch arm 45 is up, a circuit is completed via line 49, liquid solenoid valve 11, line 55 (including lamp 57), switch 39 and line 51 (switch 53 being closed). This opens valve 11 and liquid is delivered to cylinder C via line 9, 13, 19 and hose 23. When somewhat less than the desired weight of liquid (say one pound less) has been delivered to the cylinder, the beam 3 balances (i.e., it swings up). The beam thereupon moves switch arm 45 down to actuate switch 39 to disconnect lines 55 and 51 and connect lines 59 and 51. To solenoid 11 is thereupon deenergized and closes to cut off further delivery of liquid. A circuit is completed via lines 49, 59 and 51 so that air solenoid valve 31 is energized and opens. Compressed air is thereupon delivered through valve 31 and line 33, 19 and hose 23 to the cylinder. This blows residual liquid in line 19 and hose 23 into the cylinder to bring the weight of liquid in the cylinder up to the predetermined amount (fifty pounds, for example). Compressed air is delivered to the cylinder until the air pressure reaches a predetermined value (say 230 p.s.i., for example) as determined by pressure switch 37. The latter then opens, breaking the circuit for air solenoid valve 31. This valve then closes, cutting off air delivery. Finally, switch 53 is opened, valve 27 is closed, and hose 23 is uncoupled from the filled cylinder to prepare for filling the next cylinder. In the example given, the cylinder is filled with fifty pounds of liquid and provided with a 230 p.s.i. air pad. Other values are readily obtained simply by using appropriate balance weights on carrier 5 and appropriate setting of the pressure switch 37.

FIG. 3 illustrates a modification wherein a conventional combination flow meter and switch unit 61 is used to measure the quantity of liquid delivered to cylinder C instead of the scale S. This combination flow meter and switch unit is connected in line 13 between the liquid solenoid valve 11 and the liquid check valve 16. The switch component of unit 61 is a double-throw switch comparable to switch 39. Power source 47 has line 49 connected to liquid solenoid valve 11 and line 51 including switch 53 connected to the common terminal of the double-throw switch of unit 61. Line 63 including lamp 57, interconnects solenoid valve 11 and one terminal of the switch of unit 61. Air solenoid valve 31 and pressure switch 37 are connected in series in a line 65 between line 49 and another terminal of the switch of unit 61. This switch is initially adapted to interconnect lines 63 and 51. When a predetermined quantity of liquid has flowed through unit 61, the switch is actuated to disconnect lines 63 and 51 and connect lines 65 and 51.

With regard to FIG. 2, on closing switch 53, a circuit is completed via line 49, valve 11, line 63, the switch of unit 61 and line 51. Valve 11 opens and liquid is delivered to the cylinder C. When somewhat less than the predetermined quantity of liquid has been delivered, as determined by the setting of unit 61, the switch of unit 61 is actuated to disconnect lines 63 and 51 and connect lines 51 and 65. Valve 11 is thereupon deenergized and closes to cut off flow of liquid. A circuit is completed via lines 49, 65, the switch of unit 61, and line 51 so that air solenoid valve 31 is energized and opens. Compressed air is thereupon delivered in the same manner as in the FIG. 1 embodiment and cut off by operation of pressure switch 37 when the air pressure reaches a predetermined value.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Dispensing apparatus comprising a delivery line for a liquid including a first cut-off valve, a delivery line for a gas in gaseous state including a second cut-off valve, said delivery lines being connected together and having a common outlet means for opening the first valve for delivery of the liquid through the outlet, means responsive to delivery of a predetermined amount of the liquid for closing the first valve to cut off the delivery of the liquid and for opening the second valve for delivery of the gas through the outlet, and pressure-responsive means for closing the second valve to cut off the delivery of the gas upon development in said gas delivery line of a predetermined gas pressure.

2. Dispensing apparatus comprising a delivery line for a liquid including a first solenoid valve, a delivery line for a gas in a gaseous state including a second solenoid valve, said delivery lines being connected together and having a common outlet means for energizing the first valve to open it for delivery of the liquid through the outlet, means responsive to delivery of a predetermined amount of the liquid for deenergizing the first valve to close it to cut off the delivery of the liquid and for energizing the second valve to open it for delivery of the gas through the outlet, and a switch responsive to pressure in said gas delivery line for deenergizing the second valve to close it to cut off the delivery of the gas upon development in said gas delivery line of a predetermined gas pressure.

3. Cylinder filling apparatus comprising a line for delivering a liquid to a cylinder, said liquid line having a first cut-off valve therein, a line for delivering air to the cylinder, said air line having a second cut-off valve therein, said liquid line and said air line being connected together and having a common outlet, means for opening the first valve for delivery of the liquid through the outlet to the cylinder, means responsive to delivery of a predetermined amount of the liquid for closing the first valve to cut off the delivery of the liquid to the cylinder and for opening the second valve for delivery of air through the outlet to the cylinder, and means responsive to development of a predetermined air pressure in the cylinder for closing the second valve to cut off the delivery of air to the cylinder.

4. Cylinder filling apparatus as set forth in claim 3 wherein said means responsive to delivery of a predetermined amount of liquid includes a weighing scale on which a cylinder being filled is weighed.

5. Cylinder filling apparatus as set forth in claim 3 wherein said means responsive to delivery of a predetermined amount of liquid includes a flow meter.

6. Cylinder filling apparatus comprising a line for delivering a liquid to a cylinder, said liquid line having a first solenoid valve therein, a line for delivering air to the cylinder, said air line having a second solenoid valve therein, said liquid line and said air line being connected together and having a common outlet, means for energizing the first valve to open it for delivery of the liquid through the outlet to the cylinder, means responsive to delivery of a predetermined amount of the liquid for deenergizing the first valve to close it to cut off the delivery of the liquid to the cylinder and for energizing the second valve to open it for delivery of air through the outlet to the cylinder, and a switch responsive to development of a predetermined air pressure in the cylinder for deenergizing the second valve to close it to cut off the delivery of air to the cylinder.

7. Cylinder filling apparatus as set forth in claim 6 wherein said means responsive to delivery of a predetermined amount of liquid comprises a weighing scale on which a cylinder being filled is weighed, and a switch controlled by the scale.

8. Cylinder filling apparatus as set forth in claim 6 wherein said means responsive to delivery of a predetermined amount of liquid comprises a flow meter and a switch controlled by the flow meter.

9. Cylinder filling apparatus comprising a line for delivering a liquid to a cylinder, said liquid line having a first solenoid valve therein, a line for delivering air to the cylinder, said air line having a second solenoid valve therein, said liquid line and said air line being connected to a hose adapted to be coupled to a cylinder to be filled, means for energizing the first valve to open it for delivery of the liquid through the hose to the cylinder, means responsive to delivery of a predetermined amount of the liquid for deenergizing the first valve to close it to cut off the delivery of the liquid to the cylinder and for energizing the second valve to open it for blowing liquid from the hose and for delivery of air through the hose to the cylinder, and a pressure-responsive switch in said air line downstream from said second valve responsive to development of a predetermined air pressure in the cylinder for deenergizing the second valve to close it to cut off the delivery of air to the cylinder.

10. Cylinder filling apparatus as set forth in claim 9 wherein said means responsive to delivery of a predetermined amount of liquid comprises a weighing scale on which a cylinder being filled is weighed, said scale having a beam, and a switch controlled by the beam.

11. Cylinder filling apparatus as set forth in claim 10 wherein said liquid line has a check valve therein downstream from said first valve and said air line has a check valve therein between said second valve and said pressure-responsive switch.

12. Cylinder filling apparatus as set forth in claim 9 wherein said means responsive to delivery of a predetermined amount of liquid comprises a flow meter in said liquid line downstream from said first valve and a switch controlled by the flow meter.

13. Cylinder filling apparatus as set forth in claim 12 wherein said liquid line has a check valve therein and said air line has a check valve therein between said second valve and said pressure-responsive switch.

References Cited in the file of this patent

UNITED STATES PATENTS

| | | |
|---|---|---|
| 246,967 | Matthews | Sept. 13, 1881 |
| 2,059,210 | Devers | Nov. 3, 1936 |
| 2,383,761 | Benton | Aug. 28, 1945 |
| 2,387,894 | Fannin | Oct. 30, 1945 |
| 2,518,064 | Rapisarda | Aug. 8, 1950 |
| 2,527,136 | Kagi et al. | Oct. 24, 1950 |
| 2,663,247 | Hensgen et al. | Dec. 22, 1953 |
| 2,755,057 | Knobel | July 17, 1956 |
| 2,763,415 | Bagarozy | Sept. 18, 1956 |
| 2,787,402 | Stiner et al. | Apr. 2, 1957 |